2,914,383
PROCESS OF PURIFYING GRAPHITE

Helmut Ulrich, Munich, Germany, assignor to Graphitwerk-Kropfmuhl-Aktiengesellschaft, Munich, Germany No Drawing. Application November 14, 1952
Serial No. 320,599

Claims priority, application Germany November 16, 1951

4 Claims. (Cl. 23—209.9)

The present invention relates to a new and improved process of purifying graphite and more particularly to a process of purifying graphite whereby the impurities of the graphite may be easily removed.

There are many known processes, both mechanical and chemical, for the purification of graphite. The chemical processes are generally divided into two classes, namely, wet processes and dry processes. The wet processes are fairly difficult of accomplishment because the salts of the impurities which are produced are very difficult to remove from the graphite.

An electrothermic dry process is known wherein the graphite is treated at such high temperature that the impurities are first transformed into carbides, then destroyed and vaporized. This process involves a high cost and also has a disadvantage in that the structure of the graphite is changed by the process. Furthermore traces of silica carbide remain which impair the application of the graphite as lubricant.

It is therefore an object of the present invention to provide a process of purifying graphite which avoids the above enumerated difficulties.

It is a further object of the present invention to provide a dry process for the purification of graphite whereby the impurities may be easily and completely removed from the graphite.

It is still a further object of the present invention to provide a process of purifying graphite whereby the impurities may be removed from the graphite in gaseous state so that the graphite is recovered in substantially pure form.

It is another object of the present invention to provide a process of purifying graphite whereby the impurities contained in the graphite are easily separated from the same and removed without any change in the structure of the graphite.

With the above objects in view the present invention comprises the steps of treating said graphite with a gaseous agent adapted to react with at least one of the impurities in the graphite to form with the impurities substances volatile at a predetermined temperature while maintaining the predetermined temperature, thereby freeing the impurities from the graphite in the form of a gaseous composition of the same, and removing the thus formed gaseous composition along with excess gaseous agent from the thus treated graphite, thereby obtaining substantially pure graphite.

The graphite is preferably heated to at least to the predetermined temperature during the treatment step so as to facilitate the production of the compounds of the impurities and simultaneous volatilization of the same so that the impurities are rapidly removed.

It is sometimes desirable to heat the graphite during treatment to a relatively high temperature. In general no temperature higher than the glow temperature of the carbon is necessary. The term "glow temperature" as used in the specification and claims refers to the temperature at which said graphite starts to glow and become luminescent.

It may also be desirable to carry out the treatment of the graphite, with the gaseous agent adapted to react with the impurities in the graphite, in the presence of a catalyst adapted to promote this reaction. Such catalyst may preferably be gaseous or solid and simple pretesting can determine the most suitable catalyst for this purpose. The catalyst may vary somewhat depending on the impurity in the graphite which is desired to be removed.

Therefore, according to the invention, the graphite is preferably treated at a raised temperature by passing a stream of chemically active gas through the graphite, the chemically active gas reacting with the impurities in the graphite to form a compound or compounds which are volatile at a known temperature. If this known temperature is below the temperature of treatment, the compounds formed volatilize during the treatment and are removed along with excess gas from the apparatus in which the treatment is accomplished. The graphite may be heated to the glow temperature at either atmospheric pressure of at a reduced pressure of i.e. 50 mm. and less, the heating of the graphite to the glow temperature aiding in freeing of the graphite of both absorbed and adsorbed impurities. The glow temperature of graphite is generally about 700–800° C.

If the impurities of the graphite consist mainly of silicon dioxide ($SiO_2$), the purification of the graphite is accomplished by treating the same at a raised temperature with hydrogen fluoride gas whereby the silica is transformed into silicon fluoride ($SiF_4$). The reaction may be carried out, depending upon the condition of the graphite (the grain size, the percentage of dust, etc.) in a coated rotating drum or in a vertical shaft continually or intermittently charged. In either case the treatment is carried out so that the gas passes through the pores of the mass.

If the impurities consist of a mixture of silicates or iron compounds i.e. iron pyrites, etc. A slightly different method may be employed because the fluoride is too difficultly volatile according to the process of the present invention. In such case the graphite is treated at the glow temperature thereof with chlorine, preferably in the presence of a gaseous or solid catalyst. A suitable gaseous catalyst for this purpose, though the process of the present invention is in no way meant to be limited by any single catalyst is carbon tetrachloride, and a suitable solid catalyst is sodium chloride. This process causes the quantitative production of chlorides of the impurities, at least part of which chlorides have a boiling point well below the reaction temperature utilized. The chlorides remaining have a sufficient vapor pressure so that they may be sublimed and distilled off in economical fashion from the reaction mass and removed along with the stream of chlorine gas with which the graphite is treated.

In place of chlorine it is possible to utilize phosgene or a highly chlorinated hydrocarbon vapor, i.e., $CCl_4$, which upon heating, decomposes to chlorine and carbon monoxide or carbon.

Also in this manner it is possible to have a continuous process i.e. in a chlorine- and heat-resistant coated rotating oven as well as in a shaft furnace. A shaft furnace having a diameter of 30 cm. and a height of 1 meter is quite satisfactory. By the use of chlorine as treating gas and carrying out the process in the presence of a catalyst it is possible in such shaft furnace by a continuous process to obtain in 24 hours, 100 kg. of 99.6% pure graphite starting with graphite which was only 93% pure.

Without the application of a catalyst, the same process would result in obtaining the same quantity of about 97% pure graphite.

By the use of a rotating oven having about the same dimensions, about double the yield is obtained.

It is also suitable and convenient to carry out the process in an electric oven, thereby utilizing the electrical conductivity of the graphite for the conduction of the current. If necessary, the electrical current is supplied to the graphite by means of water-cooled iron cylinders which have their own heat resistance. Utilizing the above-mentioned dimensions of the oven and utilizing graphite having a grain size between 0.1–0.5 mm., a potential of about 30 volts is obtained with a current input of about 200–300 amperes, thereby achieving a reaction temperature of about 1000° C. It is possible to utilize bucket wheels in order to make the oven gas-tight.

As gaseous catalyst it is possible to utilize for example carbon tetrachloride in an amount of about 1 volume percent in the mixture of the same with chlorine gas. As solid catalyst it is possible to utilize about 1% by weight sodium chloride, of the weight of the starting material, mixed with the graphite. However care has to be taken in this case that the catalysts evaporate in the reaction zone. For instance, sodium chloride should evaporate under the mentioned operating conditions at about 1000° C., the vapor mixing with the exhaust gases.

Sodium chloride has a vapor pressure of about 10 mm., at a temperature of about 975° C. so that if it remains in the oven with the graphite for several hours, it may be easily removed from the graphite by the gas current and therefore does not remain to contaminate the graphite.

Similarly to all over halogens, the chlorine can at high temperatures pass between the net-like or grill-like structure of the graphite. The graphite which has been purified can therefore have any remaining chlorine removed therefrom by passing air therethrough at a temperature of about 700–800° C., or the oven containing the graphite may be evacuated at this temperature. In either case the chlorine may be easily removed.

For certain purposes it is necessary to carry out the reaction utilizing a certain temperature and type of gas so that the graphite is purified in a specific manner. For example if the graphite is to be used for galvanic cells it is necessary to remove all traces of iron, whereas for the application of graphite as lubricant it is necessary to remove all traces of silicon dioxide. The iron traces may be removed by treating the graphite with a gaseous agent consisting of carbon monoxide whereby carbonyl compounds are formed which have a sufficiently low boiling point so that the carbonyl compounds are carried away with the exhaust gas. If the graphite contains certain iron compounds it is necessary before conversion of the compounds to carbonyl compounds to first reduce the iron, for example by first treating the graphite with producer gas, containing hydrogen and nitrogen as well as carbon monoxide, so that the reduced iron is simultaneously transformed by the carbon monoxide into the carbonyl compounds.

The graphite generally contains the iron impurities in the form of pyrite. In order to produce iron carbonyl compounds it is necessary to first transform the iron of the pyrite into metallic iron. This is accomplished preferably in a rotating oven by passing an excess of air over the graphite at a temperature of about 500° C. The iron is thereby transformed into iron oxide. The iron oxide can then be treated with a reducing gas such as producer gas mainly consisting of carbon monoxide, to form metallic iron.

The thus treated graphite can then be further treated in various ways: either the graphite is reacted with producer gas at a temperature of about 150° C. for about 20 hours i.e. in a rotating oven to remove the 1% iron as the carbonyl compound; or by treatment of the graphite with carbon monoxide gas at about 200° C. and about 100 or more atmospheres of pressure the reaction can be completed in about 1 hour. In this manner by the use of a rotating oven having a diameter of one meter and a length of about 10 meters it is possible to reduce to metallic iron and remove the iron from 50 kg. graphite per hour by further treatment in an autoclave having a capacity of about 100 liters. In this case it is necessary to utilize an autoclave and feed pipes for the introduction of the carbon monoxide the inner walls of which do not contain either iron or nickel so that there is no possibility of forming carbonyl compounds. It is suitable to utilize for this purpose copper, brass or aluminum for the inner coating.

Instead of the reaction with carbon monoxide to remove the iron from the graphite, it is possible to remove the iron by treating the graphite with chlorine utilizing a temperature of about 500° C. At this temperature practically only the iron compounds of the impurities are attacked. When, as in most cases, the iron content of the graphite is about 1%, it is only necessary to utilize about 25 kg. of chlorine to purify 1000 kg. graphite. It is unnecessary according to this process to utilize any catalyst.

The following examples are given as illustrative of the process of the present invention and are in no way meant to limit the scope thereof.

*Example 1*

100 kg. impure graphite containing about 93 kg. of pure graphite and containing silica and pyrite as main impurities is placed in a rotating oven. The oven is heated to a temperature of about 1000° C. and chlorine gas is passed through the heated graphite. About 12 kg. of chlorine is passed through the graphite during a 24 hour period.

After the 24 hours, the oven is cooled and air is passed through the graphite to remove any remaining chlorine. The graphite is removed from the oven and is found to be 97% pure.

*Example 2*

This example is carried out exactly as Example 1 utilizing the same quality and quantity of graphite and the same quantity of chlorine during the 24 hour period. However, 1.2 kg. carbon tetrachloride as catalyst is added to the chlorine gas and is passed through the graphite along with the chlorine. The graphite obtained after the 24 hours is 99.6% pure.

It is possible to utilize 1 kg. sodium chloride mixed with the graphite instead of utilizing the 1.2 kg. carbontetrachloride. The results obtained are substantially the same.

*Example 3*

100 kg. impure graphite containing about 1 kg. iron compounds (pyrite) is placed in a rotating oven. This oven is heated to a temperature of about 500° C. and air is passed through the heated graphite. After a period of two hours all pyrite is changed into iron oxide:

$$FeS_2 + 2\tfrac{1}{2} O_2 \rightarrow FeO + 2SO_2$$

The sulfur dioxide is removed with the air. Afterwards the temperature is brought up to 1000° C. during further 2 hours. 6 m³ producer gas are passed through the heated graphite.

$$FeO + CO \rightarrow Fe + CO_2$$

The iron compounds in the graphite are now all changed into metallic iron.

The temperature of the oven is then brought down to 200° C. and maintained for about 20 hours. During this period about 100 m.³ are passed through the graphite:

$$Fe + 5CO \rightarrow Fe(CO)_5$$

The iron is thus removed as the carbonyl.

The predetermined temperature need not be maintained at all times, but may be changed, increased or reduced during the reaction period.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A process of purifying graphite containing impurities, comprising the steps of treating said graphite with a gaseous agent adapted to react with at least one of the impurities in said graphite to form with said impurities substances volatile at a predetermined temperature in the presence of a solid catalyst adapted to promote said reaction while maintaining said predetermined temperature, thereby freeing said impurities from said graphite in the form of a gaseous composition of the same; and removing the thus formed gaseous composition along with excess gaseous agent from the thus treated graphite, thereby obtaining substantially pure graphite.

2. A process of purifying graphite containing impurities, comprising the steps of treating said graphite with chlorine gas adapted to react with at least one of the impurities in said graphite to form with said impurities substances volatile at a predetermined temperature while maintaining said predetermined temperature and in the presence of a catalyst adapted to promote said reaction and being selected from the group consisting of carbon tetrachloride and sodium chloride, thereby freeing said impurities from said graphite in the form of a gaseous composition of the same; and removing the thus formed gaseous composition along with excess chlorine gas from the thus treated graphite, thereby obtaining substantially pure graphite.

3. A process of purifying graphite containing as impurity mainly iron pyrites, comprising the steps of treating said graphite with chlorine gas at the glow temperature of said graphite and in the presence of carbon tetrachloride as catalyst, said chlorine being adapted to react with said iron pyrites in said graphite to form a chloride volatile at a predetermined temperature while maintaining said predetermined temperature, thereby freeing said graphite of said iron pyrites in the form of a gaseous composition of the same; and removing the thus formed gaseous chloride along with the excess chlorine gas from the thus treated graphite, thereby obtaining substantially pure graphite.

4. A process of purifying graphite containing as impurity mainly iron pyrites, comprising the steps of treating said graphite with chlorine gas at the glow temperature of said graphite and in the presence of sodium chloride as catalyst, said chlorine being adapted to react with said iron pyrites in said graphite to form a chloride volatile at a predetermined temperature while maintaining said predetermined temperature, thereby freeing said graphite of said iron pyrites in the form of a gaseous composition of the same; and removing the thus formed gaseous chloride along with the excess chlorine gas from the thus treated graphite, thereby obtaining substantially pure graphite.

References Cited in the file of this patent

UNITED STATES PATENTS

| | | |
|---|---|---|
| 1,303,362 | Mott | May 13, 1919 |
| 2,149,671 | Franck | Mar. 7, 1939 |
| 2,315,346 | Mitchell | Mar. 30, 1943 |
| 2,624,698 | Hickey | Jan. 6, 1953 |

FOREIGN PATENTS

| | | |
|---|---|---|
| 453,072 | Great Britain | Sept. 4, 1936 |
| 598,146 | Great Britain | Feb. 11, 1948 |
| 957,912 | France | Aug. 29, 1949 |